(12) United States Patent
Zaitsev (10) Patent No.: US 7,657,941 B1
(45) Date of Patent: Feb. 2, 2010

(54) HARDWARE-BASED ANTI-VIRUS SYSTEM

(75) Inventor: Oleg V. Zaitsev, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 0 days.

(21) Appl. No.: 12/563,119

(22) Filed: Sep. 19, 2009

(30) Foreign Application Priority Data

Dec. 26, 2008 (RU) ............................ 2008151543

(51) Int. Cl.
*G06F 11/00* (2006.01)
*G06F 12/14* (2006.01)
*G06F 12/16* (2006.01)
*G08B 23/00* (2006.01)
*G06F 11/30* (2006.01)
*B41K 3/38* (2006.01)
*G06F 9/44* (2006.01)
*G06F 9/445* (2006.01)

(52) U.S. Cl. ................ 726/24; 713/187; 713/188; 713/192; 380/59; 717/168; 717/174

(58) Field of Classification Search ............ None
See application file for complete search history.

(56) References Cited

U.S. PATENT DOCUMENTS

| 7,216,366 | B1 | 5/2007 | Raz et al. |
| 7,451,435 | B2 | 11/2008 | Hunt et al. |
| 2006/0174345 | A1 | 8/2006 | Flanagan et al. |
| 2007/0261112 | A1 | 11/2007 | Todd et al. |

*Primary Examiner*—Nasser Moazzami
*Assistant Examiner*—Oscar A Louie
(74) *Attorney, Agent, or Firm*—Bardmesser Law Group (57) ABSTRACT

An anti-virus (AV) system based on a hardware-implemented AV module for curing infected computer systems and a method for updating AV databases for effective curing of the computer system. The hardware-based AV system is located between a PC and a disk device. The hardware-based AV system can be implemented as a separate device or it can be integrated into a disk controller. An update method of the AV databases uses a two-phase approach. First, the updates are transferred to from a trusted utility to an update sector of the AV system. Then, the updates are verified within the AV system and the AV databases are updated. The AV system has its own CPU and memory and can be used in combination with AV application.

20 Claims, 7 Drawing Sheets

HARDWARE-BASED ANTI-VIRUS SYSTEM

CROSS-REFERENCE TO RELATED APPLICATIONS

This application claims priority to Russian Utility Model Application No. 2008151543, filed on Dec. 26, 2008, which is incorporated by reference herein in its entirety.

BACKGROUND OF THE INVENTION

1. Field of the Invention

The present invention is related to methods of protection against malware and, in particular, to identification and removal of malware components and to providing an anti-virus system for curing infected computer systems.

2. Description of the Related Art

Detection of viruses and malware has been a concern throughout the era of the personal computer. With the growth of communication networks such as the Internet and increasing interchange of data, including the rapid growth in the use of e-mail for communications, the infection of computers and networks through communications or file exchanges is an increasingly significant consideration. Infections take various forms, but are typically related to computer viruses, Trojan programs, or other forms of malicious code (i.e., malware).

Recent incidents of e-mail mediated virus attacks have been dramatic both for the speed of propagation and for the extent of damage, with Internet service providers (ISPs) and companies suffering service problems and a loss of e-mail and networking capability. In many instances, attempts to adequately prevent file exchange or e-mail mediated infections significantly inconvenience computer users. Improved strategies for detecting and removing malware components from the computer systems are desired.

Conventional anti-virus (AV) systems are part of an operating system. Anti-virus applications are typically installed on computer system OS. The AV applications use two methods for accomplishing their tasks: scanning files for known viruses, and detecting suspicious application behavior resembling behavior patterns of the infected applications. Since most of the malware components are written on a hard drive, scanning of the hard drives is essential.

One conventional approach to detecting viruses is signature scanning Signature scanning systems use sample code patterns extracted from known malware code and scan for the occurrence of these patterns in other program code. A primary limitation of the signature scanning method is that only known malicious code is detected, that is, only code that matches the stored sample signatures of known malicious code is identified as being infected. All viruses or malicious code not previously identified, and all viruses or malicious code created after the last update to the signature database, will not be detected.

In addition, the signature analysis technique fails to identify the presence of a virus if the signature is not aligned in the code in the expected fashion. Alternatively, the authors of a virus may obscure the identity of the virus by opcode substitution or by inserting dummy or random code into virus functions. Nonsense code can be inserted that alters the signature of the virus to a sufficient extent as to be undetectable by a signature scanning program, without diminishing the ability of the virus to propagate and deliver its payload.

Another virus detection strategy is integrity checking Integrity checking systems extract a code sample from known, benign application program code. The code sample is stored, together with information from the program file, such as the executable program header and the file length, as well as the date and the time stamp of the sample. The program file is checked at regular intervals against this database to ensure that the program file has not been modified.

An effective conventional approach uses so-called white lists the lists of known "clean" software components, links, libraries and other clean objects. In order to compare a suspect object against the white list, hash values can be used. The use of hashes is disclosed, for example, in WO/2007066333 where the white list consists of hashes of known clean applications. In WO/2007066333, checksums are calculated and compared against the known checksums.

Conventional AV applications use operating memory and processor resources in the same manner as other applications (including malware applications). The AV applications installed in the OS have both administrative and user rights. However, some of the malware components have the same rights. Therefore, the AV application, having equal rights with a malware component, cannot remove some of the malware components.

A primary example of such malware components are "rootkits." The term "rootkit" refers to a number of utilities or special modules of the OS core that are installed by an intruder on a hacked computer system upon acquiring administrative rights. This set of installed utilities typically includes a number of functions for hiding any signs of hacking the system. The rootkit allows the intruder to settle inside the system and hide his files, processes, and signs of the rootkit presence in the system.

Thus, the rootkit can not only hide from the users, but can be effectively hidden from the AV applications as well. There is a probability of the rootkit gaining more privileged rights than an AV application and damaging the AV or diminishing its effectiveness.

Anti-virus systems can be implemented as firmware-type network filters. For example, gatekeepers such as Card Pro and Pico are provided by Yoggie Inc. The gatekeepers have their own CPU and memory. However, the gatekeepers do not provide any protection against rootkits, as they serve only as filters of incoming network traffic.

A filtering method used in gatekeepers works only at data representation level using OSI model. However, this model does not protect from rootkits that are already present on data storage. Thus, data storage needs to be periodically scanned for rootkits and other malware.

A number of conventional methods for fighting the rootkits exist, but there is no method that can guarantee full rootkit removal from the system.

A conventional AV application has to be installed on the OS. This creates a problem of loading system resources during execution of the AV applications, since the AV application uses common system resources. Therefore, there is a need for an AV system that can completely remove the malware components such as rootkits, while avoiding rights and access issues, and that does not utilize computer system resources.

SUMMARY OF THE INVENTION

The present invention is related to methods of protection against malware and, in particular, to identification and removal of malware components. The present invention provides an anti-virus (AV) system for curing infected computer systems that substantially obviates one or several of the disadvantages of the related art.

In one aspect of the invention there is provided an AV system based on a hardware-implemented AV module for curing infected computer systems. A method for updating AV databases for effective curing of the computer system is also provided. The hardware-based AV system is located between a PC and disk device. The hardware-based AV system can be implemented as a separate device or it can be integrated into a disk controller.

It can also be located in the interface cable between the PC and the disk as a transparent filter. Thus, a computer does not suspect that the data, it attempts to write onto data storage media, is being monitored. Accordingly, the malware components will not detect that their actions are being monitored either. An update method of the AV databases uses a two-phase approach. First, the updates are transferred from a trusted PC utility to an update sector (i.e., isolated memory area) of the AV system. Then, the updates are verified within the AV system and the AV databases are updated.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

According to an exemplary embodiment, a hardware-based AV system and a method for updating AV databases for effective curing of the computer system are provided. The hardware-based AV system is located between a PC and a disk device. The AV system, of the exemplary embodiment, can be implemented as a separate device or it can be integrated into a disk controller. It can also be located in the interface cable between the PC and the disk, acting as a transparent filter. Thus, a computer does not know that the data, it attempts to write onto data storage media, is being monitored. Accordingly, the malware components will not detect that their actions are being monitored either.

A detailed description of a hardware-based AV system and a method of its update are provided below. Note that a disk, in this discussion, is any of data storage medias such as: magnetic and magnetic-optical disks (e.g., a Floppy disk, a ZIP disk, a Hard drive), optical disks (e.g., CD, DVD, Blue-ray), flash memory drives (USB, SSD, etc.), etc.

Figure 1:
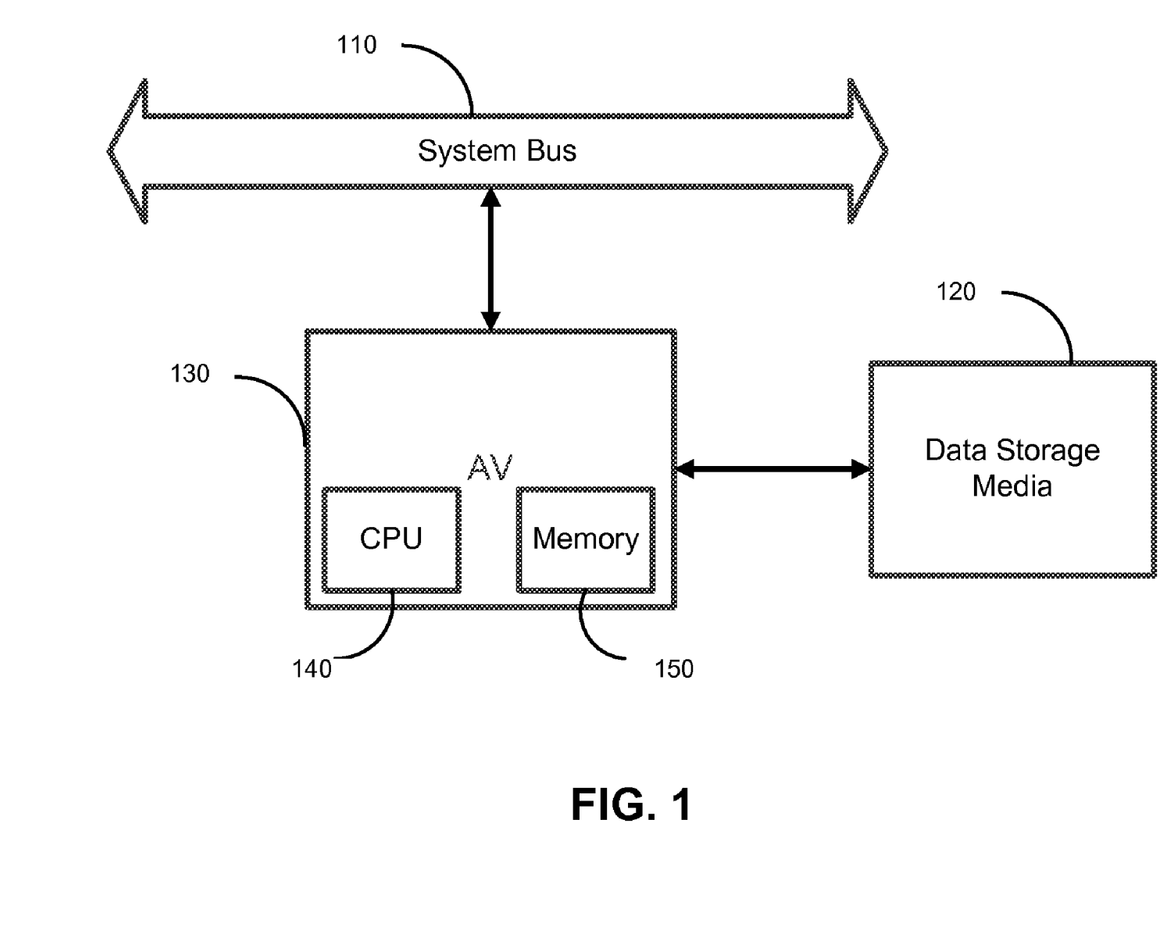
FIG. 1 illustrates a structure of a hardware-based AV system in accordance with the exemplary embodiment.

FIG. 1 illustrates a structure of a hardware-based AV system, in accordance with the exemplary embodiment. A hardware-based AV system 130 is located between PC and disk 120. The hardware-based AV system 130 is connected to a system bus 110 of the PC. The hardware-based AV system 130 has its own central processing unit 140 and an operating memory unit 150. Thus, the AV system does not use any common system resources of the PC. The AV system works independently without loading the computer system resources, unlike almost all conventional AV solutions. In one embodiment, the AV system can be integrated into a disk controller 120.

Figure 2:
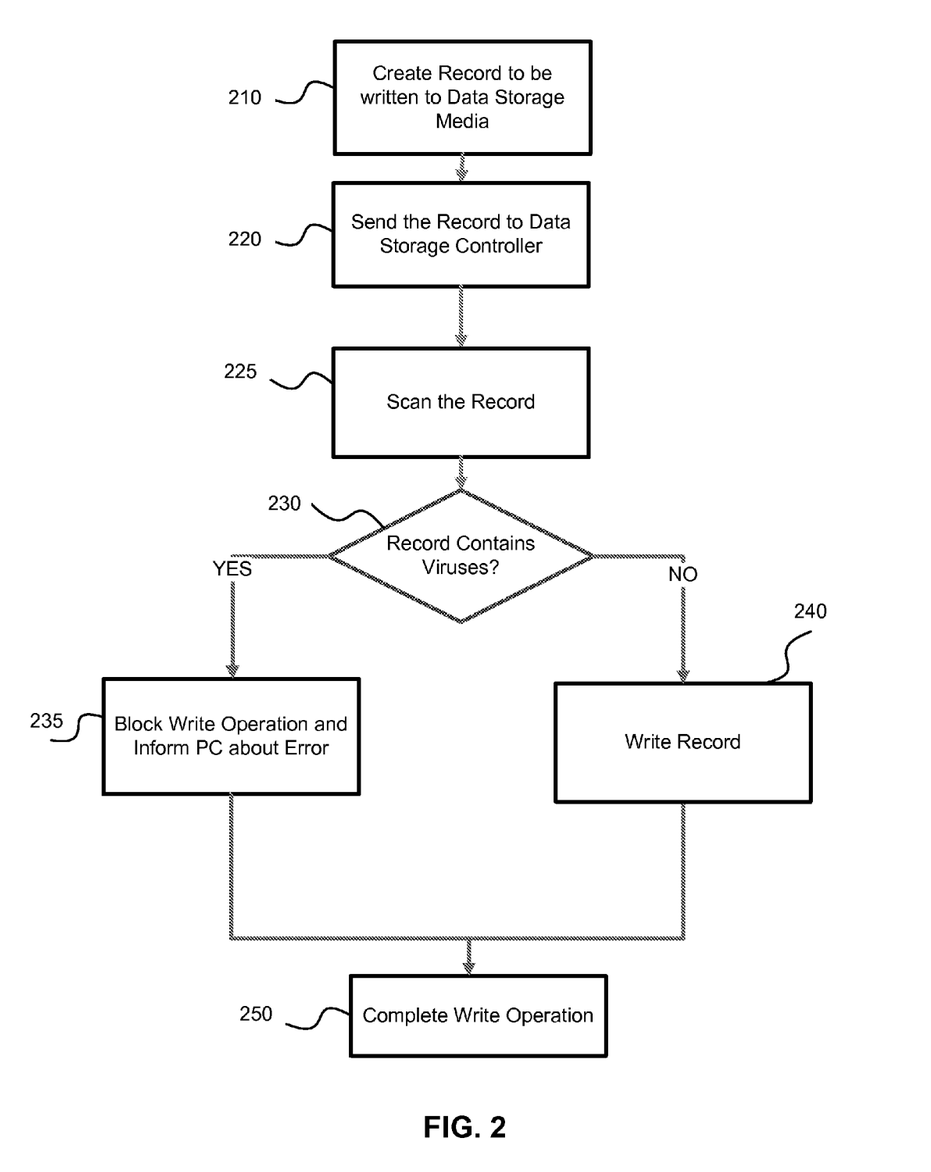
FIG. 2 illustrates a block diagram of an algorithm employed by the AV system in accordance with the exemplary embodiment.

FIG. 2 illustrates a block diagram of an algorithm employed by the AV system, in accordance with an exemplary embodiment. A data record is formed in step 210. Then, a PC provides this record to a disk controller, in step 220. In the exemplary embodiment, the hardware-based AV system is embedded in the hard disk controller. The hardware-based AV system, in step 225, begins to scan all data records being transferred from the PC to the disk for malware components. If it is determined, in step 230, that the transferred data does not contain any viruses, the data is written onto a disk, in step 240.

Otherwise, if the virus is detected, the system can imitate write to disk operation, without actually executing this operation. A malware component "thinks" that the write operation has been performed, while no data changes actually take place. Alternatively, an error message reflecting an error in execution of a write operation is sent to the computer system. Thus, the computer system knows that the write operation was not completed successfully in step 235. The AV operation is completed in step 250.

A number of implementations of the hardware-based AV system using low-level data passed through the disk controller can be used. In one embodiment, contents of the disk sectors are analyzed during data transfer. However, this method alone has certain shortcomings based on limited capabilities of the AV system. The AV system scans data only when it is being written to or read out from the disk. Yet, there are many hidden files that are not being executed in the system.

These files will not be detected by the hardware-based AV system, since they do not perform any read/write operations. Consequently, these files will not be detected as malware. In the exemplary embodiment, this problem is solved by scanning the disk independently of the PC. In this case, when the malware objects are found, the system neutralizes them. However, scanning the file system requires its own file system analyzer. In this case, during a disk scan it can be determined if a first segment of a given file refers to an executable file. Then, this file can be taken under a special control, if is determined that the file contains executable code. Note that in the exemplary embodiment an arbitrary file system can be used.

In yet another embodiment, the hardware-based AV system works together with conventional AV applications installed on the PC. An AV application 310, depicted in FIG. 3, has a set of encoded commands that can be used to give directions to the hardware-based AV system 320. This gives the AV application 310 access to the disk 330, while bypassing a hierarchy of rights. In this embodiment, AV application 310 can find rootkits or other malware components located on disk 330. Normally, the detected rootkits cannot be removed by AV application 310 due to the fact that many OSs give limited administrative rights for applications.

Figure 3:
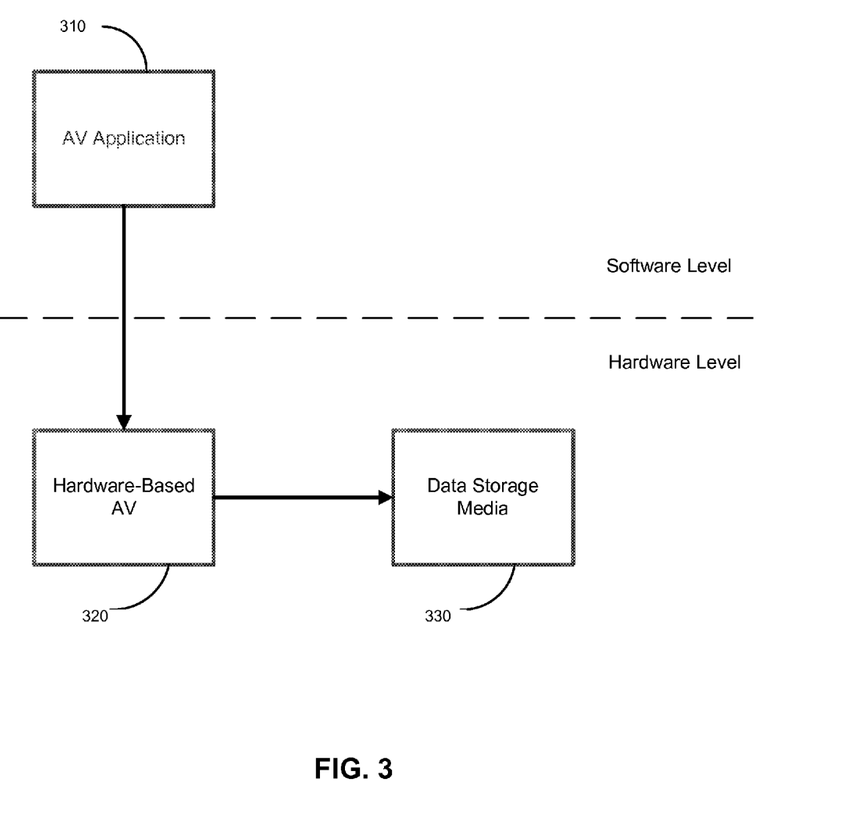
FIG. 3 illustrates an example of using a hardware-based AV system with an AV application in accordance with the exemplary embodiment.

Even if the AV application 310 has administrative rights, the AV application 310 cannot remove a rootkit having the equal rights. However, a combination of an AV application 310 with a hardware-based AV system 320 (that works outside of PC's OS and is not susceptible to rights-related policies enforced by the OS) enhances the effectiveness of the AV application 310 by giving it an ability to remove rootkits and other malware components. In this embodiment, the rootkits can be detected by the AV application and removed by the hardware AV module.

One of the main tasks performed by an AV system is updating AV databases. The AV databases always have to be in a current (i.e., updated) state in order to protect against the newest malware components. In one embodiment, when hardware-based AV works together with the AV application, updates are downloaded by the AV application. The hardware-based AV does not use the updates in this case. In this embodiment, the hardware-based AV plays a secondary role and is only used for removing malware objects and the rootkits found by the AV application.

Figure 4:
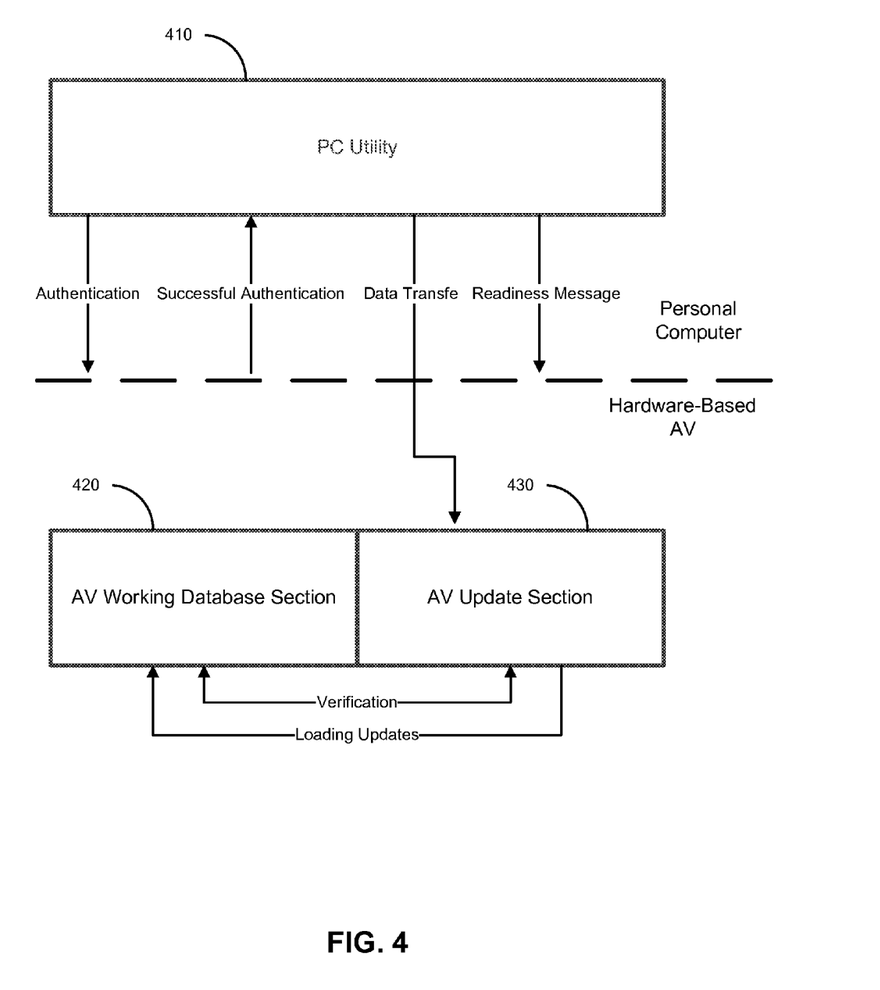
FIG. 4 illustrates an exemplary architecture used for updating AV databases of the hardware-based AV system in accordance with the exemplary embodiment.

Another exemplary embodiment is illustrated in FIG. 4. A special PC utility 410 having system privileges installed on a user computer system is responsible for downloading updates. The PC utility has a special driver communicating with the hardware-based AV system. In this case, the hardware-based AV system is logically divided into two parts (e.g., isolated memory sections): a main part 420, including working AV databases and a code, and an update part 430. The hardware-based AV system is connected with the PC via the PC utility 410.

The utility 410, when updates are downloaded, connects to the hardware-based AV system and sends a secret code (or an encrypted key). For enhanced security a long cryptographic key can be used. The key can also be periodically updated. Alternatively an asymmetric cryptographic key scheme can be employed for authentication of the PC utility.

The secret code identifies the PC utility 410 (e.g., driver) to the AV system as a trusted module. In turn, the hardware-based AV system sends a response indicating successful authentication to the PC utility 410. Then, the PC utility 410 begins to transfer updates to the AV update part 430. Note that the working databases and the AV code in the part 420 are not affected at this point. After the updates are downloaded, the utility 410 informs the AV system that updates have been loaded and are ready to be used.

Then, the updates are verified within the AV system. The verification can include signature comparison, checksums verifications, etc. The AV system performs the internal verification (i.e., between the two logical AV parts). Thus, malware components cannot interfere with the verification procedure or read the verification algorithm. If the verification is successful, the updates are loaded from the update section 430 into the area of working databases and code 420 of the AV system.

This two-step update method protects the hardware-based AV system from loading a malware code or loading outdated malware-related data. Even if the malware attempts to load a malicious code instead of the updates, the malicious code will not pass through the internal verification process. In order to do that, the intruder has to break into a PC utility driver, derive the secret key from it and present itself to the AV system as a trusted utility.

Alternatively an asymmetric cryptographic schema can be used for authentication to provide a protection from the intruder who somehow acquires a secret key. Thus, the AV system is protected in all possible situations. The outdated AV data will not be loaded into the AV as it is also checked during verification procedure taking place prior to loading updates from the AV sector 430 into the sector 420.

Figure 5:
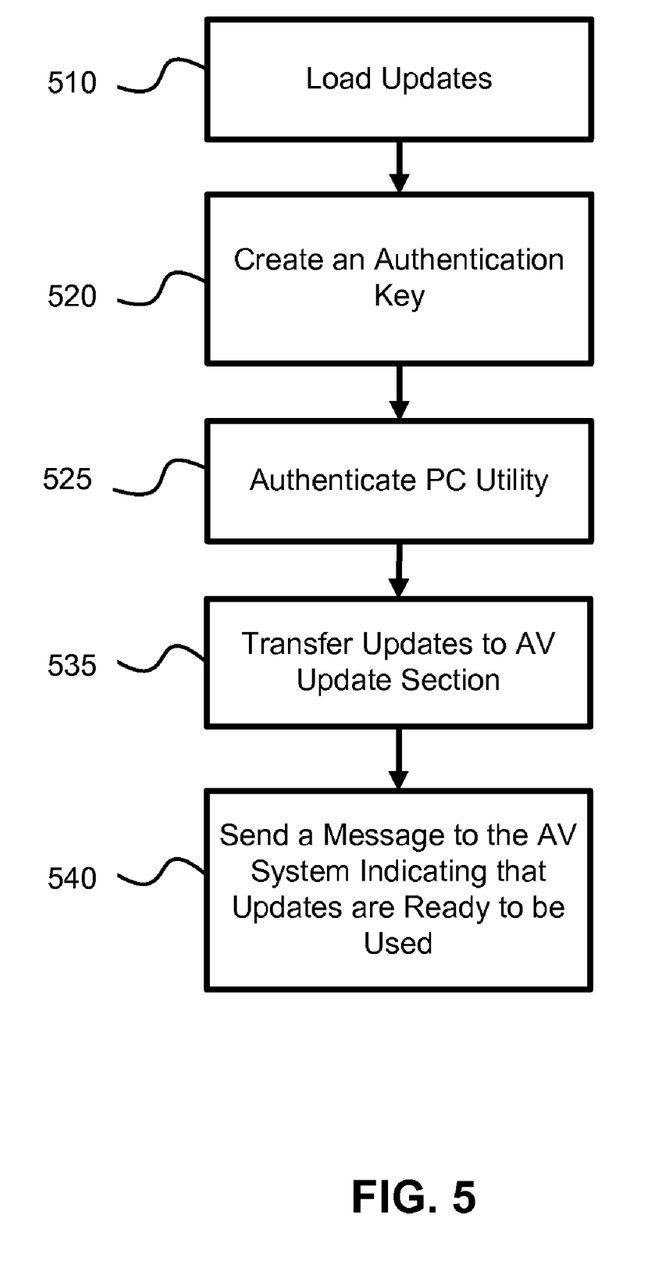
FIG. 5 illustrates a block diagram of a method for updating hardware-based AV system in accordance with the exemplary embodiment.

FIG. 5 illustrates a block diagram of a method for updating hardware-based AV system using special utility installed on a PC, in accordance with the exemplary embodiment. The PC utility 410 begins periodically downloading updates in step 510. After the updates are downloaded, in step 520, the utility 410 creates a secret code (e.g., encryption key) that identifies the utility as a trusted module to the AV system.

Then, the utility 410 can be connected to the hardware-based AV module. In step 525, the utility receives an authentication verdict. In case of successful authentication, the utility begins to transfer updates to the hardware-based AV module in step 535. Once the update transfer is completed, in step 540, the utility sends a message indicating successful update transfer to the AV module. Then, an update of the working AV databases is started.

Figure 6:
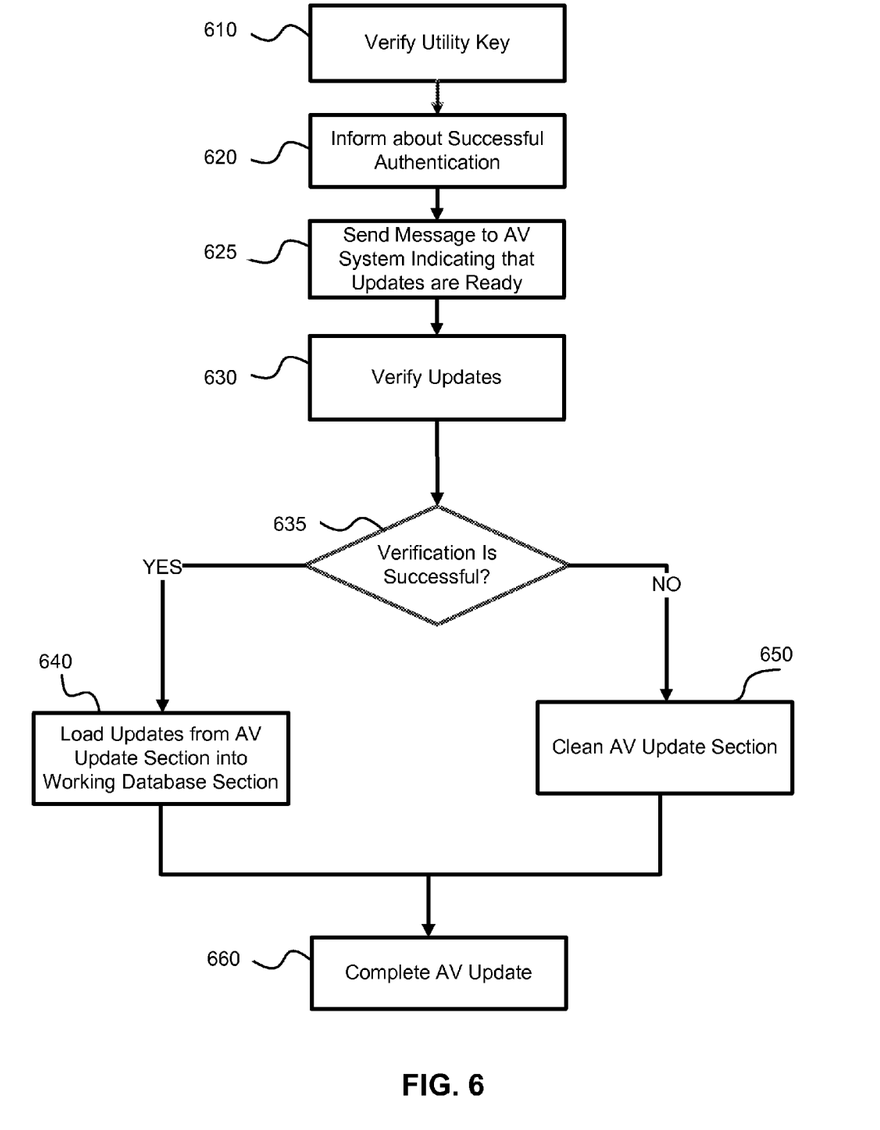
FIG. 6 illustrates a detailed flow chart of updating the hardware-based AV system in accordance with the exemplary embodiment.

FIG. 6 illustrates a detailed flow chart of updating the hardware-based AV system, in accordance with the exemplary embodiment. The hardware-based AV system receives a secret code (e.g., encrypted key) from the PC utility in step 610. Once the code is received and the utility is verified as a trusted PC module, the AV system sends an authentication verdict to the PC utility, in step 620.

Then, in step 430, the PC utility transfers updates to the update section of the AV system. Once the update transfer is completed, the PC utility informs the AV system that the updates are ready to be used, see step 625. The AV system performs verification of the received updates in step 630. If the verification in step 635 is successful (i.e., the database updates reflect new malware-related data), the updates are re-written, in step 640, from the update area 430 into working database area 420. If the updates do not pass the verification, they are removed from the AV update section 430 in step 650. Then, the update of the AV system is completed.

Those skilled in the art will appreciate that the exemplary embodiment advantageously provides for effective detection and removal of malware including the rootkits without putting any burden on computer system resources.

Figure 7:
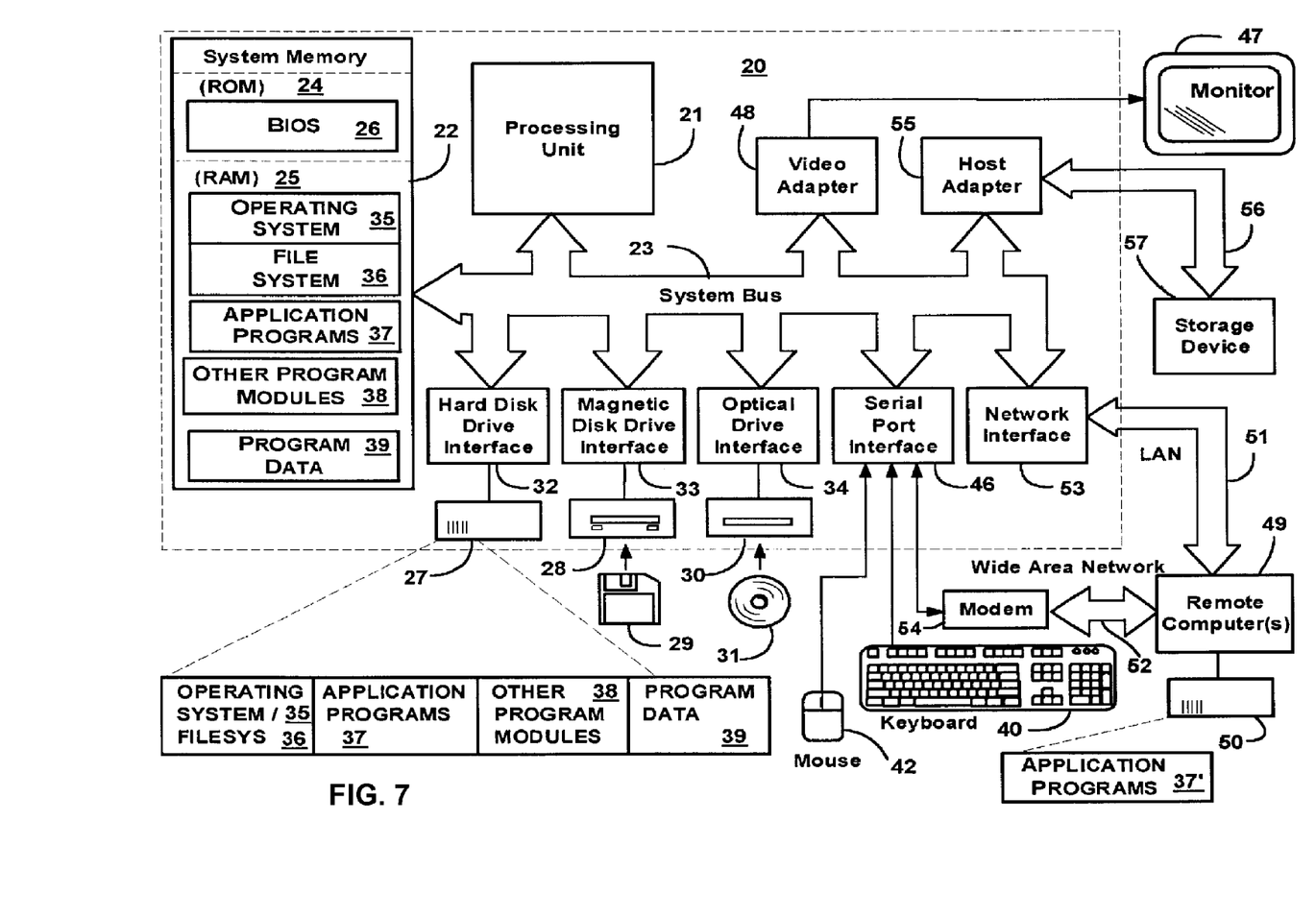
FIG. 7 illustrates a schematic of an exemplary computer system that can be used for implementation of the invention.

With reference to FIG. 7, an exemplary system for implementing the invention includes a general purpose computing device in the form of a computer or server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for an effective detection and prevention of computer virus-related epidemics.

It should also be appreciated that various modifications, adaptations and alternative embodiments thereof may be made within the scope and spirit of the present invention. The invention is further defined by the following claims.

What is claimed is:

1. A hardware-based anti-virus (AV) system, the system comprising:
   a hardware-based AV module coupled to a system bus and located between the system bus and a disk drive, the hardware-based AV module having an AV CPU and an AV memory;
   the hardware-based AV module configured to connect to a utility of a computer system that runs with system privileges,
   wherein the hardware-based AV module authenticates the utility using an asymmetric cryptographic key; and
   the hardware-based AV module configured to access a data storage media, wherein the hardware-based AV module monitors write operations to the data storage media initiated by the computer system, and the hardware-based AV module blocks write operations upon malware detection and sends an error message to the computer system.

2. The system of claim 1, wherein the utility is an AV connection driver.

3. The system of claim 1, wherein the hardware-based AV module comprises an AV database containing known malware objects, the AV database is updated by the utility.

4. The system of claim 3, wherein the hardware-based AV module authenticates the utility as a trusted module prior to receiving AV updates.

5. The system of claim 4, wherein the hardware-based AV module verifies the AV updates prior to applying the updates to the AV database.

6. The system of claim 5, wherein an AV application maintains an AV database that is updated periodically.

7. The system of claim 6, wherein the AV application detects malware objects and the hardware-based AV module removes the detected malware objects from the computer.

8. The system of claim 4, wherein the hardware-based AV module authenticates the utility using a secret key previously provided by the utility.

9. The system of claim 4, wherein the the asymmetric cryptographic key is provided by the utility.

10. The system of claim 1, wherein the hardware-based AV module detects and removes malware objects from a disk drive.

11. The system of claim 10, wherein the malware objects are rootkits.

12. The system of claim 1, further comprising an AV application installed on the computer system, wherein the AV application issues commands to the hardware-based AV module.

13. The method of claim 1, further comprising blocking the AV updates containing malware objects.

14. The method of claim 13, further comprising blocking the AV updates for those updates that reflect outdated malware-related data.

15. The method of claim 13, wherein the authenticating of the operating system utility comprises cryptographic processing of the authentication data.

16. A method of updating a hardware-based anti-virus (AV) module, the method comprising:
- generating AV updates for the hardware-based AV module, by a computer system the AV module being located between a system bus and a disk drive;
- providing an authentication data to the hardware-based AV module, by a computer operating system utility;
- authenticating the operating system utility using an asymmetric cryptographic key, by the hardware-based AV module;
- transferring the AV updates to the hardware-based AV module, by the operating system utility that is authenticated as a trusted module;
- informing, by the operating system utility, the hardware-based AV module that the AV updates are downloaded;
- verifying the AV updates by the hardware-based AV module; and
- applying the AV updates to AV database provided that the updates do not contain malware objects.

17. The method of claim 16, wherein the operating system utility is a driver installed on the PC.

18. The method of claim 16, wherein the hardware-based AV module has logically isolated memory areas.

19. The method of claim 18, wherein an isolated AV memory area is used for downloading and verifying the AV updates from the operating system utility.

20. The method of claim 18, wherein an isolated AV memory area stores the AV database.

* * * * *